US005577012A

United States Patent [19]
Kobayashi et al.

[11] Patent Number: 5,577,012
[45] Date of Patent: Nov. 19, 1996

[54] DATA RECORDING METHOD, DATA RECORDING APPARATUS, AND DATA RECORDING MEDIUM

[75] Inventors: Seiji Kobayashi, Kanagawa; Joost D. Kock, Tokyo, both of Japan

[73] Assignee: Sony Corporation, Tokyo, Japan

[21] Appl. No.: 447,366

[22] Filed: May 23, 1995

Related U.S. Application Data

[62] Division of Ser. No. 136,311, Oct. 13, 1993, abandoned.

[30] Foreign Application Priority Data

Oct. 13, 1992 [JP] Japan .................................. 4-300470

[51] Int. Cl.$^6$ ........................................... G11B 7/00
[52] U.S. Cl. .................................. 369/48; 369/59
[58] Field of Search ................................ 369/59, 54, 58, 369/47, 48, 49, 124

[56]            References Cited

U.S. PATENT DOCUMENTS

| | | | |
|---|---|---|---|
| 4,646,103 | 2/1987 | Sugiyama et al. | 346/1.1 |
| 4,809,251 | 2/1989 | Collomby et al. | 369/32 |
| 4,866,692 | 9/1989 | Saito et al. | 369/59 |
| 4,928,187 | 5/1990 | Rees | 360/40 |
| 5,031,168 | 7/1991 | Moore | 369/59 |
| 5,109,373 | 4/1992 | Ohno et al. | 369/100 |
| 5,111,443 | 5/1992 | Yokogawa | 369/54 |
| 5,161,145 | 11/1992 | Ogawa et al. | 369/59 |
| 5,206,853 | 4/1993 | Tanaka | 369/54 |
| 5,218,591 | 6/1993 | Shimamoto et al. | 369/54 |
| 5,241,524 | 8/1993 | Lee | 369/50 |
| 5,345,434 | 9/1994 | Ide et al. | 369/124 |
| 5,347,505 | 9/1994 | Moritsugu et al. | 369/59 |
| 5,400,318 | 3/1995 | Nakayama et al. | 369/275.3 |
| 5,414,689 | 5/1995 | Maeda et al. | 369/116 |
| 5,450,381 | 9/1995 | Tsukamura et al. | 369/47 |

FOREIGN PATENT DOCUMENTS

| | | | |
|---|---|---|---|
| 0256498A3 | 2/1988 | European Pat. Off. | G11B 20/10 |
| 0477892A3 | 4/1992 | European Pat. Off. | G11B 7/125 |
| 2664420 | 1/1992 | France | G11B 7/08 |
| WO93/16467 | 8/1993 | WIPO | G11B 7/00 |
| WO93/16468 | 8/1993 | WIPO | G11B 7/00 |

OTHER PUBLICATIONS

Journal of the Optical Society of America, vol. 69, No. 1, Jan. 1979, pp. 4–24, H. H. Hopkins; "Diffraction theory of laser read-out systems for optical video discs."Applied Optics, vol. 26, No. 18, 15 Sep. 1987, pp. 3961–3973, Shigeo Kubota, "Aplanatic condition required to reproduce jitter-free signals in an optical digital disk system."Patent Abstracts of Japan, vol. 13, No. 129 (P-849), 30 Mar. 1989 & JP-A-63 298 818 (Asahi Chem Ind Co Ltd) 6 Dec. 1988. SPIE Optical Data Storage '91, vol. 1499, 27 Feb. 1991, Colorado Springs, Co., USA, pp. 419–425, Sukeda et al.: "High speed recording technologies for a magneto-optical disk system."

Primary Examiner—Nabil Z. Hindi
Attorney, Agent, or Firm—Limbach & Limbach

[57]            ABSTRACT

In recording information by shifting the positions of the front edge and the rear edge of each pit on a medium stepwise from specified reference positions according to recording data, the edges of each pit are displaced stepwise with a unit of macro-step of 0.04 μm, to express the data. The positions of the edges with macro-step are further adjusted to be displaced stepwise with a unit of micro-step of 256 kinds, thus suppressing the Inter Symbol Interference. With this adjustment, it is possible to reduce the influence of the Inter Symbol Interference, and hence to perform the recording with high density.

2 Claims, 18 Drawing Sheets

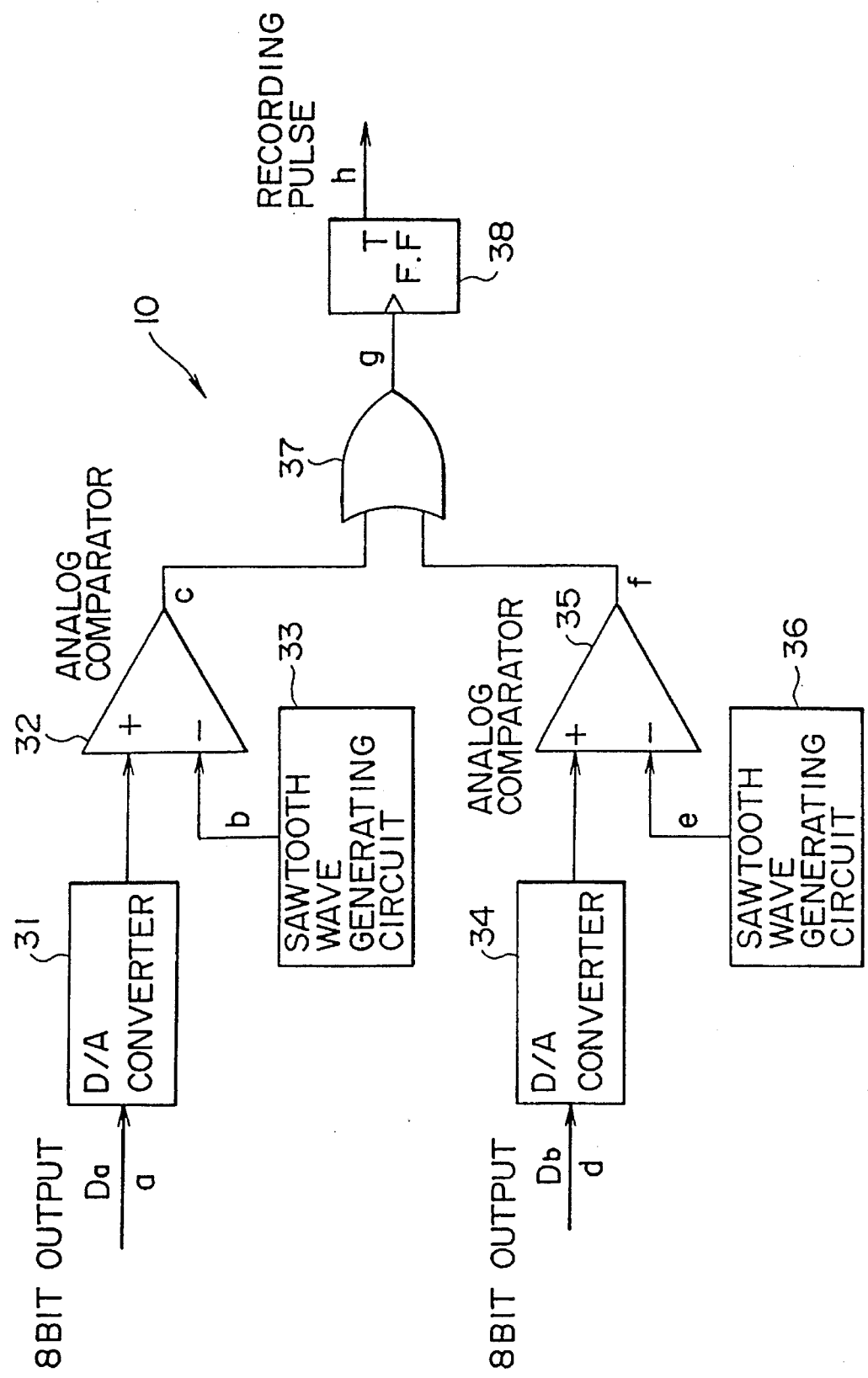

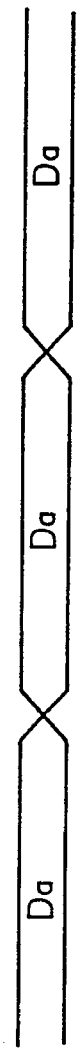 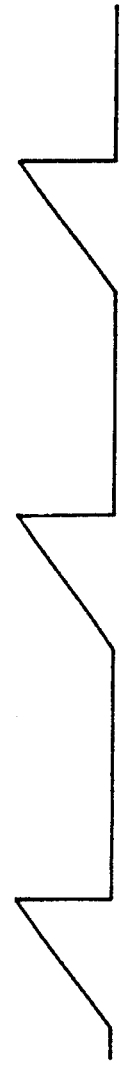 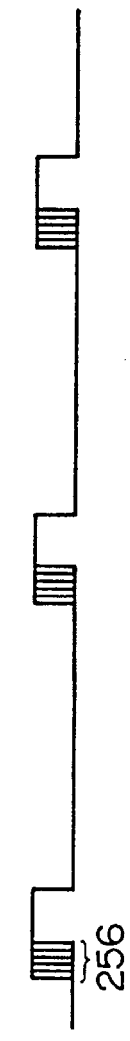 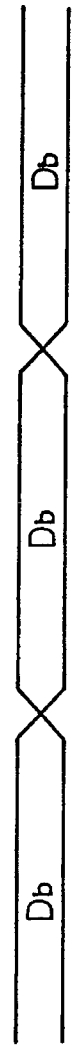 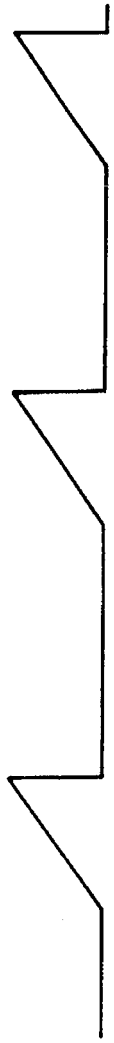 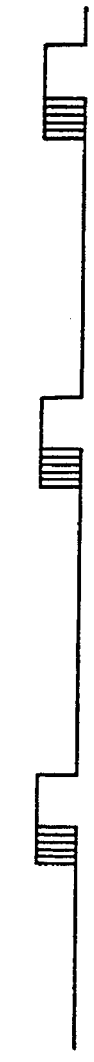  
FIG. 4(a)
FIG. 4(b)
FIG. 4(c)
FIG. 4(d)
FIG. 4(e)
FIG. 4(f)
FIG. 4(g)
FIG. 4(h)

FIG. 5(a)  FIG. 5(b)
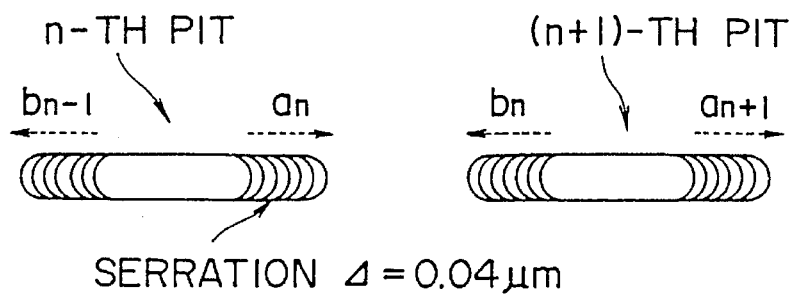
SERRATION $\Delta = 0.04\,\mu m$
FIG. 6(a)
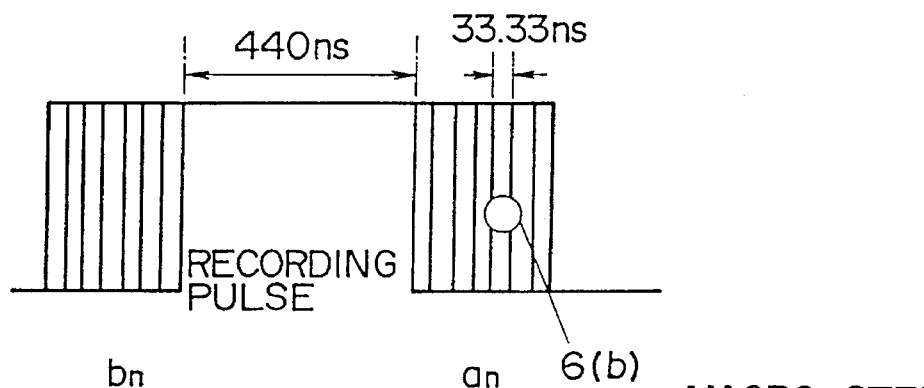
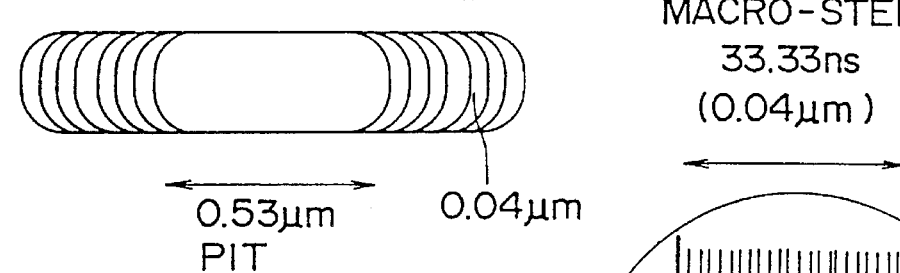
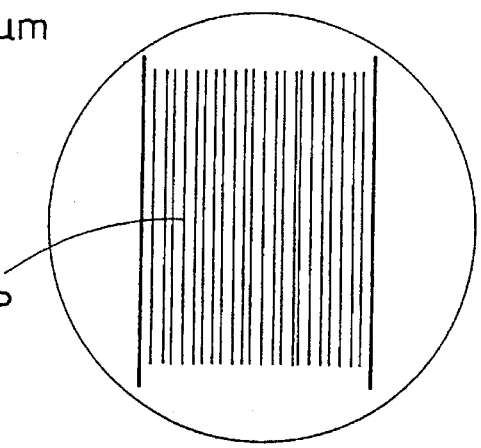
MACRO-STEP
33.33ns
(0.04 μm)
MICRO-STEP
1.67nm
(1.39ns)
24 MICRO-STEPS = 1 MACRO-STEP
FIG. 6(b)

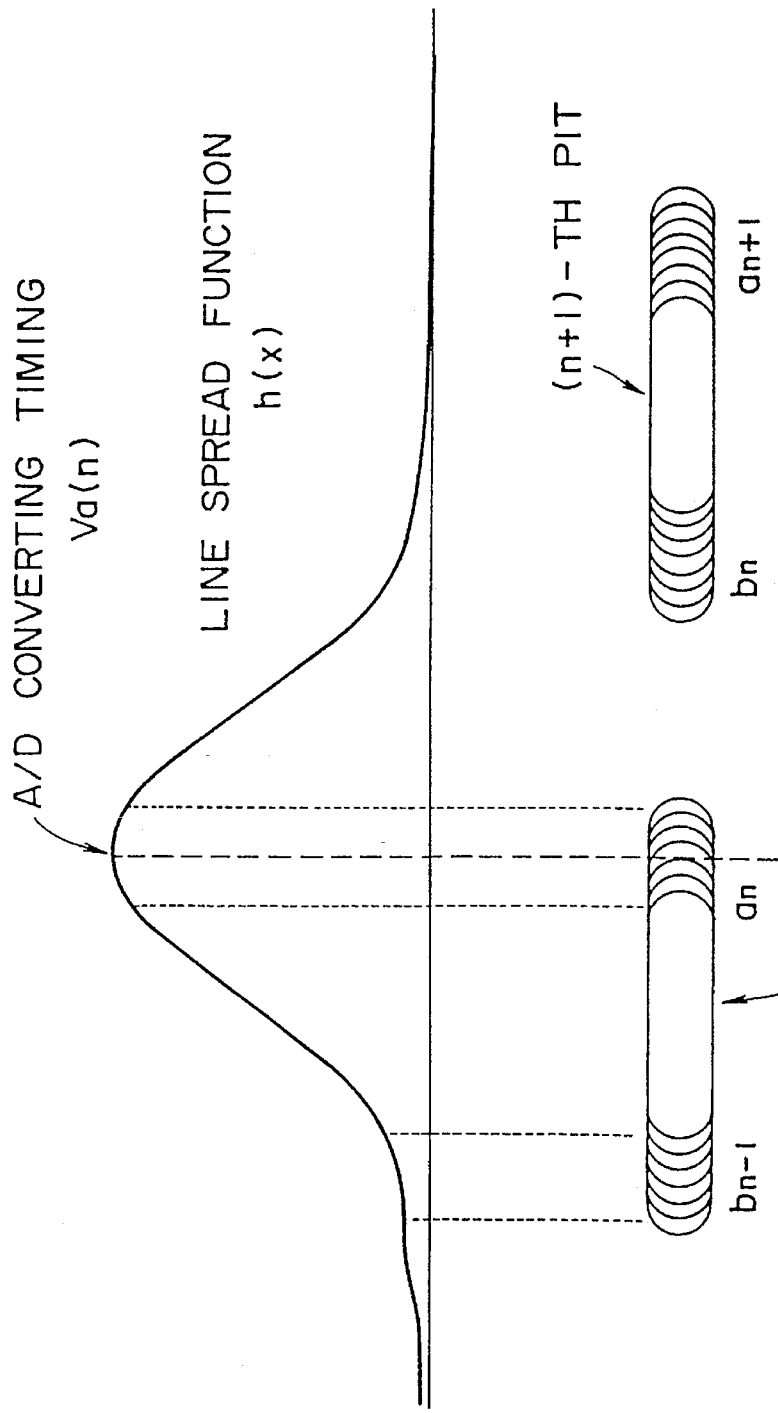

NO CORRECTION

CORRECTION

INFORMATION POINT
I(an, bn)

EXTENSION OF
INFORMATION POINT
BY bn-1 AND an+1

F I G. 16
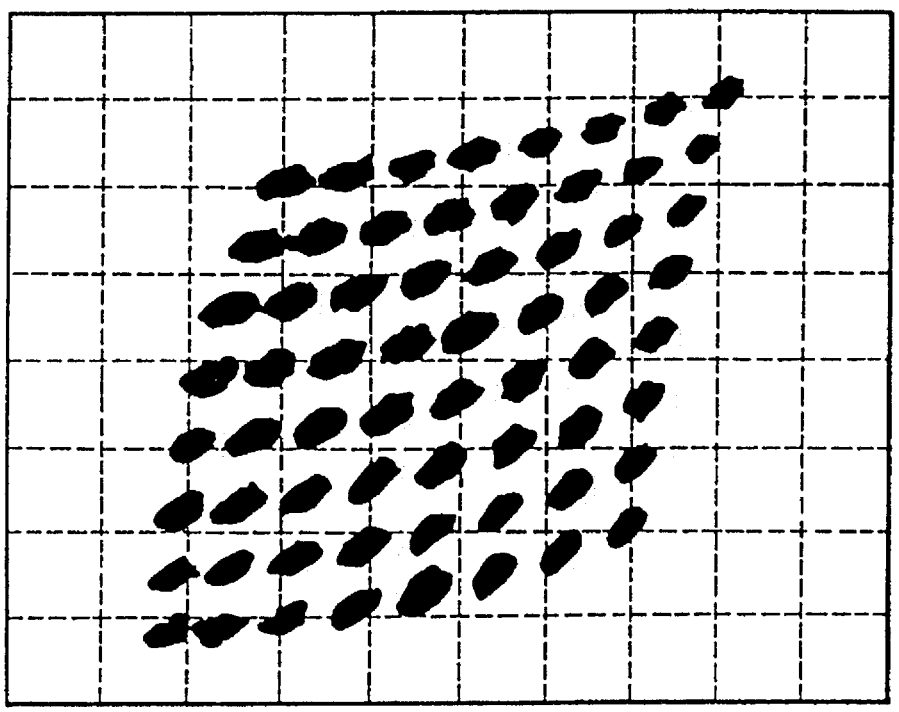

DATA RECORDING METHOD, DATA RECORDING APPARATUS, AND DATA RECORDING MEDIUM

This is a divisional of application Ser. No. 08/136,311, filed Oct. 13, 1993 abandoned.

BACKGROUND OF THE INVENTION

1. Field of the Invention

The present invention relates to a data recording method, a data recording apparatus and a data recording medium suitable For recording data in an optical disk or the like.

2. Description of the Related Art

The present inventor has proposed a technique of displacing the position of the edge of each pit stepwise according to recording data, for example, in Unexamined Japanese Patent No. HEI 4-207074 and International Application No. PCT/JP92/01250. Namely, as shown in FIG. 17, each of the positions of edges $b_{n-1}$, $a_n$, $b_n$, and $a_{n-1}$ of pits is displaced to either of the positions of from 0 to 7 according to recording data. Further, as shown in FIG. 17, the level of the reproduced signal from an optical pick-up for detecting a reflection light from each pit is subjected to sample-and-hold with a timing of a rising edge of a clock A or a clock B to be analog-digital converted, so that it is possible to judge what position the edge is disposed among the position of from 0 to Assuming that the value obtained by sampling and analog-digital converting the reproduced signal from the edge $a_n$ is taken as Va(n) and the value obtained by sampling and analog-digital converting the reproduced signal from the edge $b_n$ is taken as Vb(n), the values Va(n) and Vb(n) are expressed on XY coordinate axes as shown in FIG. 18. As the positions of the edges $a_n$ and $b_n$ are displaced into the positions of from 0 to 7, the points (information points) specified by the reproduced values Va(n) and Vb(n) are ideally positioned at the points (grids) where dotted lines are crossed to each other in FIG. 18. In practice, however, the edge $b_n$ interferes with the reproduced signal from the edge $a_n$, or the edge an interferes with the reproduced signal from the edge $b_n$. As a result, the positions of the information points (in FIG. 18, shown as black dots) specified by the level of the actual reproduced signals are deviated from the grids.

For this reason, in the previous application described above, under consideration of the deviation of the information point from the grid, the present inventor has proposed such a technique that, the position of the information point (position of the edge) on the coordinate axes is read-out as the position on the coordinate plane.

As described above, in the previous proposal technique, only the I. S. I (Inter Symbol Interference) between two edges has been examined; however, actually, there occurs the I. S. I between three or more edges. As a result, as shown in FIG. 19, the area of each information point on the coordinate axes is broadened, and the boundary between the adjacent information points is made obscure, which makes it difficult to discriminate each information point. (Namely, it is difficult to enhance the recording density).

SUMMARY OF THE INVENTION

Taking the above circumstances into consideration, the present invention has been made, and an object of the present invention is to suppress the influence of I. S. I (Inter Symbol Interference) and hence to enhance the recording density.

According to a first aspect of the present invention, there is provided a data recording method comprising the steps of: displacing the position of the edge of each pit stepwise with a unit of a macro-step as a first width according to the data to be recorded: and displacing the position of the edge specified by the macro-step, at a position where the interference due to the positions of the other edges is minimized, stepwise with micro-step as a second width smaller than the macro-step.

Preferably, the adjustment for the position of the edge with micro-step is performed in consideration of the positions of at least two adjacent edges or the positions of at least four continuous edges. Further, this adjustment may be performed using a line spread function or a Hopkins' method.

Further, the adjustment for the position of the edge with micro-step may be performed in such a manner that the information point specified by the positions of the adjacent two edges is positioned at a grid on coordinate axes specified by the positions of the adjacent two edges. The adjustment may be performed in such a manner that the area of the information is made smaller on the coordinate axes. In addition, the adjustment may be performed in such a manner that, on second coordinate axes specified by the positions of the other edges positioned on the front and rear sides of the adjacent two edges specifying the coordinate axes, the information point is concentrated at the intermediate position.

According to a second aspect of the present invention, there is provided a data recording medium for recording data by displacing the position of the edge of each pit, comprising a means for displacing the position of the edge of the pit stepwise with a unit of a macro-step according to recording data; and a means for displacing the position of the edge specified by the macro-step, at a position where the interference due to the positions of the other edges is minimized, stepwise with micro-step as a second width smaller than the macro-step.

According to a third aspect of the present invention, there is provided a data recording apparatus for recording data on a recording medium by displacing the position of the edge of each pit stepwise with macro-step, comprising: a conversion circuit 3 as a converting means for converting data corresponding to the number of steps changed with macro-step; a recording edge position calculating circuit 9 as a calculating means for calculating the position of the edge displaced with macro-step according to the data converted by the converting circuit 3, and displacing the position of the edge specified by the macro-step stepwise with micro-step smaller than the macro-step for calculating a position where the interference due to the position of the other edges is minimized; and an edge modulation circuit 10 as a signal generating means For outputting a signal with a timing corresponding to the position of the edge of each pit according to the output from the recording edge position calculating circuit 9.

Preferably, the edge modulation circuit 10 includes a D/A converter 31 as a D/A converting means for digital-analog converting the output of the recording edge position calculating circuit 9; a sawtooth wave generating circuit 33 as a sawtooth wave generating means for generating a sawtooth wave; and an analog comparator 32 as a comparing means for comparing the sawtooth wave outputted from the sawtooth wave generating circuit 33 with the output of the D/A converter 31.

In the data recording method according to the first aspect of the present invention, the position of the edge specified by macro-step is further finely displaced stepwise with micro-step. Accordingly, the data is recorded in such a state that the inter symbol interference is suppressed.

In the recording medium according to the second aspect of the present invention, the recording is performed in such a manner that the position of the edge specified with macro-step is further finely displaced stepwise with micro-step. Accordingly, it is possible to realize the recording medium with a high density.

In the recording apparatus according to the third aspect of the present invention, the position of the edge displaced with macro-step according to recording data is calculated by the recording edge position calculating circuit 9, and the position is further Finely displaced with micro-step. Accordingly, it is possible to record the data on the recording medium with high density.

BRIEF DESCRIPTION OF THE DRAWINGS

FIG. 3 is a block diagram showing the construction of an edge modulation circuit in FIG. 1;

FIG. 4(a)–4(n) is a timing chart for explaining the operation of the embodiment as shown in FIG. 3;

FIGS. 5(a) and 5(b) are views for explaining pits recorded in a disk of FIG. 1;

FIGS. 6(a) and 6(b) are views for explaining the relationship between the macro-step and the micro-step;

FIGS. 7(a), 7(b) and 7(c) are views for explaining a principle of adjusting the position of the edge expressed by macro-step to be disposed at the position of the edge expressed by micro-step using a line spread function;

FIG. 16 is s view for explaining the state of the information points in the case that the processes in FIGS. 11A and 11B, and FIGS. 13A and 13B are not executed for comparison with FIGS. 14 and 15;

DETAILED DESCRIPTION OF THE PREFERRED EMBODIMENT

Hereinafter, embodiments of the present invention will be described with reference to the accompanying drawings.

Figure 1:
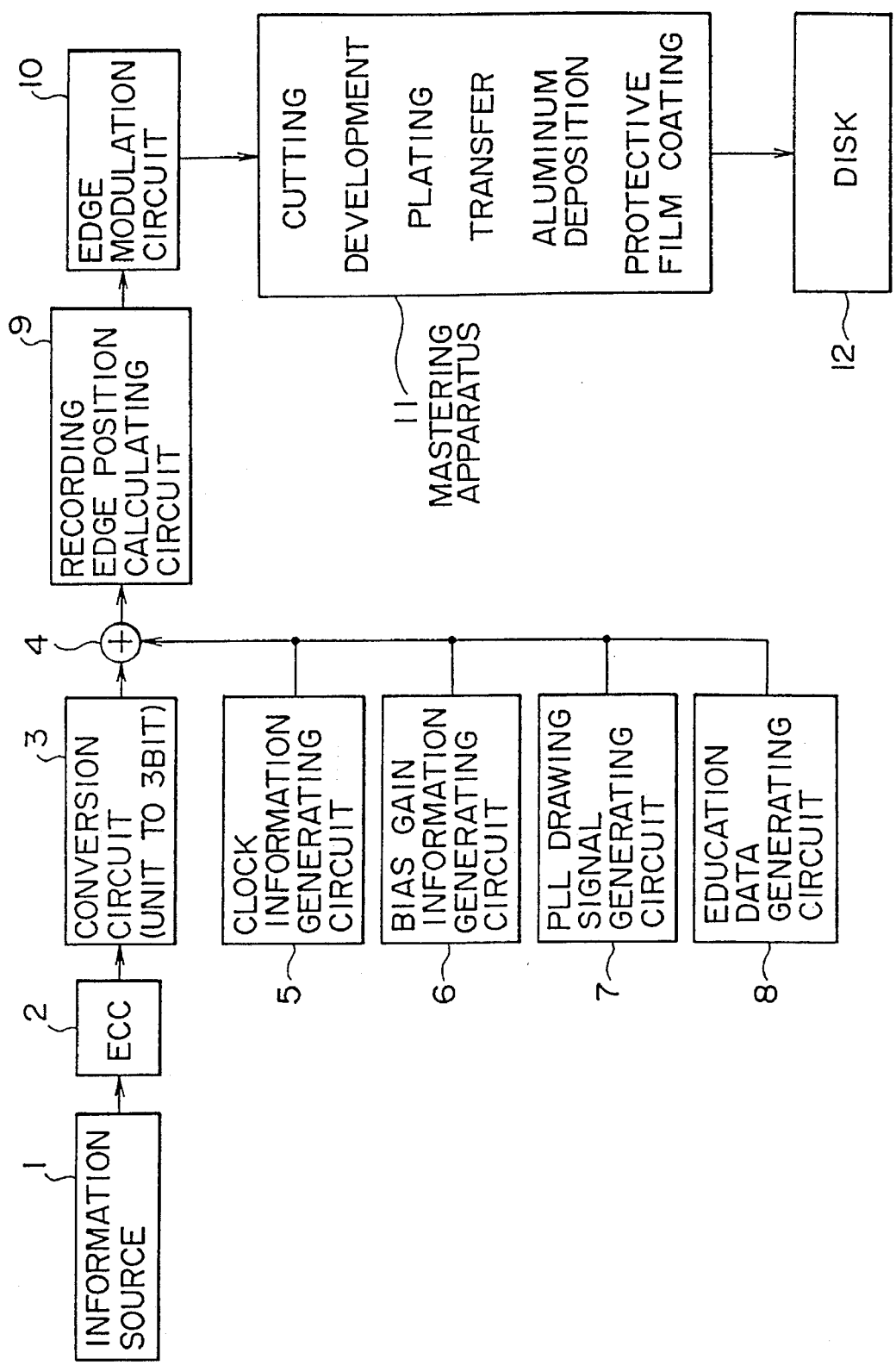
FIG. 1 is a block diagram showing the construction of a data recording apparatus of the present invention.

FIG. 1 is a block diagram showing the construction of one embodiment of a data recording apparatus of the present invention. An information source 1 outputs a signal to be recorded, for example, a digitized recording signal. An ECC circuit 2 adds an error detection and correction code to the digital audio data supplied from the information circuit 1, and outputs the data to a conversion circuit 3. The conversion circuit 3 converts the inputted data into the data with a unit of 3 bit. Namely, in this embodiment, the position of each edge is set at either of the eight positions of from 0 to 7. Accordingly, for specifying the position of each edge, 3 bit data are required. In the conversion circuit 3, the 3 bit data are produced.

A clock information generating circuit 5 generates the data required for producing a clock necessary for reading out the data recorded in a disk. A bias gain information generating circuit 6 generates the data indicating a bias point (the data indicating a reference point (0, 0), that is, the data indicating that the positions of the edges $a_n$ and $b_n$ are both 0); and the data indicating the data for setting a gain (the data indicating a reference point (7, 7), that is, the data indicating that the positions $a_n$ and $b_n$ are both 7).

A PLL drawing signal circuit 7 generates a signal for drawing PLL. An education data generating circuit 8 generates the data wherein the edge position ($a_n$, $b_n$) corresponds to each of the edge positions of from (0, 0) to (7, 7). The data outputted from the clock information generating circuit 5, bias gain information generating circuit 6, PLL drawing signal generating circuit 7 and education data generating circuit 8 are supplied to an adder 4, in which the above data are added with the data supplied from the conversion circuit 3 (subjected to time-division multiplexing).

The output of the adder 4 is supplied to a recording edge position calculating circuit 9, and the output of the recording edge position calculating circuit 9 is supplied to an edge modulation circuit 10. The output of the edge modulation circuit 10 is supplied to a mastering apparatus 11, wherein cutting, development, plating, transfer, aluminum deposition, protective film coating are performed, thus forming a disk Next, the operation will be described. The audio data outputted from the information source 1 are supplied to the ECC circuit 2, being added with an error detection and correction code, and are then supplied to the conversion circuit 3. The conversion circuit 3 converts the inputted data into the data with a unit of 3 bit. The 3 bit data specify the position of the edge of each pit at either of the eight positions of from 0 to 7. The 3 bit data outputted from the conversion circuit 3 are supplied to the recording edge position calculating circuit 9 through the adder 4.

The recording edge position calculating circuit 9, as described later, corrects the 3 bit data corresponding each edge position into 256 kinds of fine positions for correcting inter symbol interference. Namely, in the recording edge position calculating circuit 9, the position of the edge basically displaced with eight kinds of steps (macro-step) is steppedly (micro-step) corrected to be positioned at one of 256 kinds of edge positions. Namely, in the recording edge position calculating circuit 9, the original position is corrected to be disposed at the position where the inter symbol interference is made as small as possible.

The edge modulation circuit 10 generates the pulse with the timing corresponding to the data outputted from the recording edge position calculating circuit 9, and outputs the pulse to the mastering apparatus 11. The mastering apparatus 11 cuts an original disk in synchronization with the timing signal supplied from the edge modulation circuit 10. The original disk thus cut is developed, followed by plating, to produce a stamper. The pits formed with the stamper are transferred on a replica. The replica is applied with aluminum deposition, and is coated with a protective film. Thus, the disks 12 may be mass-produced.

In addition, the adder 4 is supplied with the data outputted from the clock information generating circuit 5, bias gain information generating circuit 6, PLL drawing signal generating circuit 7 and education data generating circuit 8. Accordingly, pits corresponding to these data are formed on the disk 12.

Figure 2:
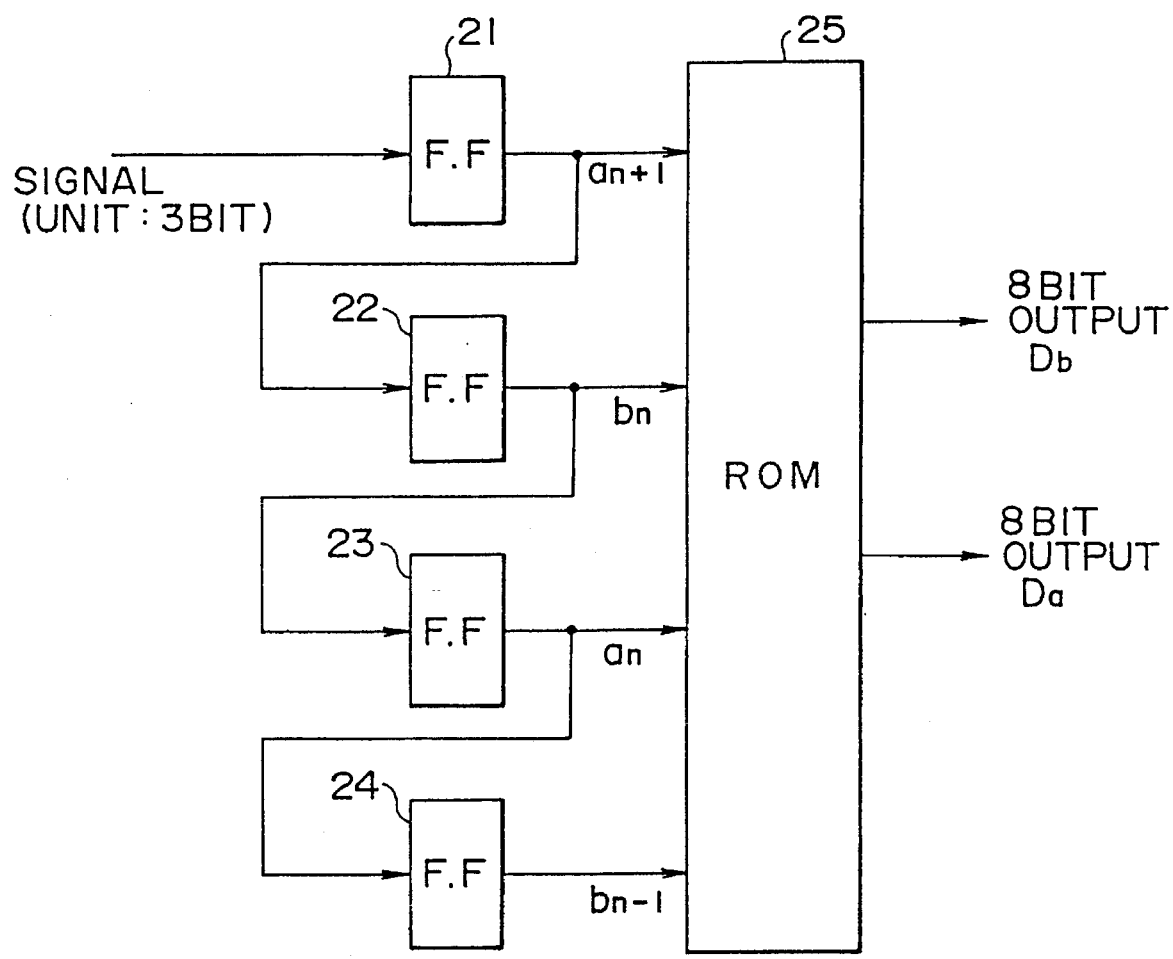
FIG. 2 is a block diagram showing the construction of a recording edge position calculating circuit in FIG. 1.

FIG. 2 shows the construction of the recording edge position calculating circuit 9. In this embodiment, the 3 bit data supplied from the adder 4 are sequentially supplied to four-stepped flip-flops 21 to 24. The outputs of the flip-flops 21 to 24 are each supplied to a ROM 25. The ROM 25 outputs 8 bit data Da and 8 bit data Db corresponding to two edge positions.

Namely, the 3 bit input data are sequentially delayed by the flip-flops 21 to 24; accordingly, when the flip-flop 23 outputs the data of the rear edge $a_n$ of the n-th pit and the flip-flop 22 outputs the data of the front edge $b_n$ of the (n+1)-th pit, the flip-flop 24 outputs the data of the front edge $b_{n-1}$ of the n-th pit and the flip-flop 20 outputs the data of the rear edge $a_{n+1}$ of the (n+1)-th pit (see FIG. 5). Thus, the data corresponding to the four continuous edges of the two continuous pits are inputted in the ROM 25.

The ROM 25 receives the input of the data corresponding to the macro-stepwise positions of the four edges, and calculates the data Da corresponding to the edge $a_n$ and the data Db corresponding to the edge $b_n$ Do that the inter symbol interference from each edge is minimized, and outputs these data Da and Db. These Da and Db are each output as the 8 bit data. Namely, the ROM 25 converts the data expressed by the macro-steps into the data expressed (finely corrected) by the micro-steps of 256 kinds, and outputs the data. The content of the converting table of this ROM 25 will be described later.

FIG. 3 shows the construction of the edge modulation circuit 10 in FIG. 1. In this embodiment, the 8 bit data Da outputted from the ROM 25 are delayed by a delay circuit including a D/A converter 31, an analog comparator 32 and a sawtooth wave generating circuit 33, and are supplied to one of input terminals of an OR-gate 37. Similarly, the 8 bit data Db outputted from the ROM 25 are delayed by a delay circuit including a D/A converter 34, an analog comparator 35 and a sawtooth wave generating circuit 36, and are then supplied to the other input terminal of the OR-gate 37. The output of the OR-gate 37 is supplied to a mastering apparatus 11 as recording pulses through a T-type flip-flop 38.

Next, the operation of the embodiment in FIG. 3 will be described with reference to the timing chart of FIG. 4. The 8 bit data Da corresponding to the edge $a_n$ outputted from the ROM 25 [FIG. 4(a)] is inputted in the D/A converter 31 to be digital-analog converted. The output of the D/A converter 31 is supplied to a non-reversal input terminal of the analog-comparator 32. A sawtooth wave signal periodically outputted from the sawtooth wave generating circuit 33 [FIG. 4(b)] is supplied in the reversal input terminal of the analog-comparator 32. The analog-comparator 32 compares the level of the signal inputted from the D/A converter 31 (this level corresponds to the position of the edge $a_n$) with the level of the sawtooth wave signal outputted from the sawtooth wave generating circuit 33. When the former is larger than the latter, the analog-comparator 32 outputs a logic H; and when being smaller, it outputs a logic L. As a result, in the output of the analog-comparator 32 [FIG. 4(c)], the timing of the rising edge is changed according to the data Da (namely, changed in 256 kinds).

D/A converter 34 digital-analog converts the data Db corresponding to the edge $b_n$ outputted from the ROM 25 [FIG. 4(d)], and supplies the converted data to the non-reversal input terminal of the analog-comparator 35. A sawtooth wave signal periodically outputted from the sawtooth wave generating circuit 36 [FIG. 4(e)] is supplied in the reversal input terminal of the analog-comparator 35. The analog-comparator 35 compares the levels of both the inputs with each other. When the output from the D/A converter 34 is larger than the sawtooth wave signal outputted from the sawtooth wave generating circuit 36, the analog-comparator outputs a logic H; and when being smaller, it outputs a logic L [FIG. 4(f)]. Namely, the timing of the rising edge in the pulse outputted from the analog-comparator 35 is changed in 256 kinds according to the data Db.

The OR-gate 37 supplies the pulses outputted from the analog-comparators 32 and 35 to a trigger terminal of the T-type flip-flop 38 [FIG. 4(g)]. The T-type flip-flop 38 is triggered at the rising edge of the output of the OR-gate 37 [FIG. 3(g)], to reverse the logic of the output pulse for each trigger [FIG. 4(h)]. As a result, in the output of the T-type flip-flop 38 [FIG. 4(h)], the rising edge is changed according to the position of the edge $a_n$, and tailing edge is changed according to the position of the edge $b_n$. The position of the edge is defined as one of the positions of 256 kinds.

Thus, the recording pulses outputted from the T-type flip-flop 38 are supplied to the mastering apparatus 11, wherein the original disk is cut, thus producing the disk 12. The disk 12 thus obtained is formed with the pits as shown in FIG. 5.

Next, the example of the converting table stored in the ROM 25 will be described. As shown in FIG. 5, it is assumed that the basic step (serration) of the edge of each pit stored in the disk 12 is taken as 0.04 μm. Namely, as the position of the edge of each pit is displaced from 1 to 7, the position of the edge is basically changed by 0.04 μm. In other words, it is assumed that the macro-step is taken as 0.04 μm.

Further, assuming that, every time when the output of the D/A converters 31 and 34 are changed by one step, the position of the edge of each pit is changed by about 1.67 nm (namely, one micro-step is taken as 1.67 nm), one macro-step corresponds to 24 (=0.04 μm/1.6 nm) micro-steps. When the linear velocity of the disk 12 is taken as 1.2 m/s and the minimum length of the pit (the length of the pit wherein the positions of the front and rear edges are both 0) is taken as 0.53 μm, the width of the recording width is 440 ns, the length of one macro-step is 40 nm (=0.04 μm), and the length of one micro-step is 1.67 nm (FIG. 6).

In the case that the influence by the edges $b_{n-1}$ and $a_{n+1}$ is not considered, the data Da and Db can be calculated by the following equation:

$$Da=24\times a_n+Ca \quad (1)$$

$$Db=24\times(-b_n)+Cb \quad (2)$$

where Ca and Cb are constants.

Next, there will be examined the cancellation of the influence of the edge $b_{n-1}$ on the reproduced value Va(n) of the edge $a_n$. Assuming that the transmitting characteristic of the optical pickup of the reproducing system is linear, MTF (Modulation Transfer Function) being the absolute value of OTF (Optical Transfer Function) of the reproducing system is subjected to inverted Fourier conversion, to obtain a line spread function h(X). FIG. 7 shows the line spread function. The influence of the edge$_{n-1}$ on the reproduced value Va(n) is proportional to the amplitude of the bottom portion of the line spread function in FIG. 7. Namely, the correction value of the table stored in the ROM 25 can be calculated by the ratio ($h_2/h_1$) between the height $h_1$ of the portion corresponding to the edge $a_n$ (central portion of the line spread function in FIG. 7) and the height $h_2$ corresponding to the edge $b_{n-1}$. In addition, the line spread function is disclosed in [S. Kubota: "Aplanatic condition required to produce jitter-free signals in an optical digital disk system"; APPLIED OPTICS/Vol. 26, N. 18/p. 3961–3972 (FIG. 13 etc.)/September 1987].

When the distance between pits is 1.67 μm, the wavelength of a laser is 780 nm, and NA of an object lens is 0.45, the correction value S ($b_{n-1}$) is calculated as Table 1.

TABLE 1

| recording data just before | correction value |
|---|---|
| $b_{n-1}$ | S ($b_{n-1}$) |
| 0 | 0 |
| 1 | 2 |
| 2 | 3 |
| 3 | 4 |
| 4 | 5 |
| 5 | 6 |
| 6 | 7 |
| 7 | 8 |

Since the influence of the edge $a_{n+1}$ on the data Db is the same as described above, the correction S ($a_{n+1}$) is calculated as shown in Table 2.

TABLE 2

| recording data just before | correction value |
|---|---|
| $a_{n+1}$ | S ($a_{n+1}$) |
| 0 | 0 |
| 1 | 2 |
| 2 | 3 |
| 3 | 4 |
| 4 | 5 |
| 5 | 6 |
| 6 | 7 |
| 7 | 8 |

As described above, the data written in the ROM 25 is specified by the following equation:

$$Da=24\times a_n-S(b_{n-1})+Ca \quad (3)$$

$$Db=24\times(-b_n)+S(a_{n+1})+Cb \quad (4)$$

Figure 8:
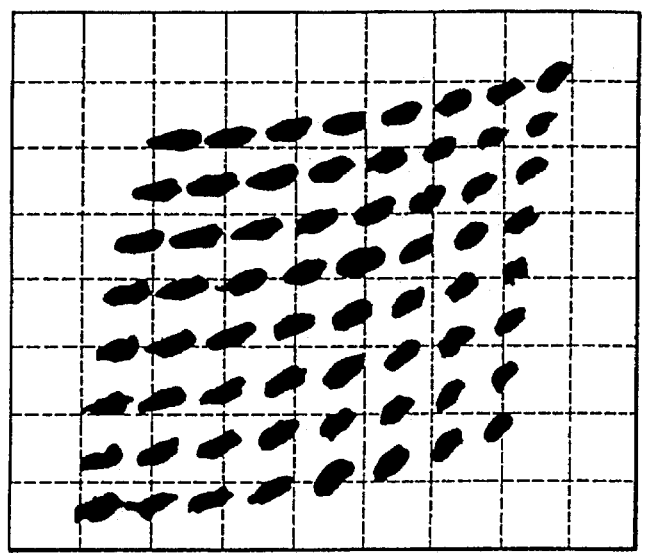
FIG. 8 is a view for explaining the state of information points in the case that the correction in FIG. 7 is not carried out.

FIG. 8 shows the state of the information points in the case that the correction is not performed. As shown in this figure, the information points are diffused (the area is enlarged), the boundary between the adjacent information points is made obscure. This means that the accurate judgement for each information point is made difficult.

Figure 9:
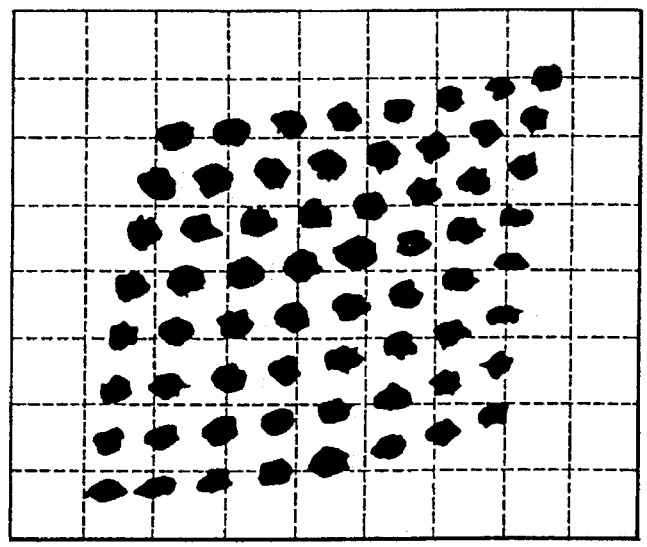
FIG. 9 is a view for explaining the state of information points in the case that the correction in FIG. 7 is carried out.

On the contrary, FIG. 9 shows the distribution state for the information points in the case that the converting table added with the correction value is written in the ROM 25. As is shown in this figure, as compared with the case as shown in FIG. 8, the information points are not diffused, so that each information point can be accurately separated and judged.

In the above-described embodiment, the inter symbol interference is corrected using the line spread function. However, the above correction for the inter symbol interference may be performed using the Hopkins' method on the basis of the content described in H. H. Hopkins: "Diffraction theory of laser read-out system For optical video discs"; Journal Optical Society of America/Vol. 69, No. 1/p. 4–24/ January 1979. In this case, the data Da and Db are calculated by the Following equations:

$$Da=24\times a_n+X_{mshift}(a_n, b_{nm})+X_{isicomp}(a_n, b_n, b_{n-1}, a_{n+1}) \quad (5)$$

$$Db=24\times b_n+Y_{mshift}(a_n, b_n)+Y_{isicomp}(a_n, b_n, b_{n-1}, a_{n+1}) \quad (6)$$

In the right sides of the above equations, the first terms are intended to covert the macro-step into the micro-step, the second terms mean correction amounts for positioning the information points on the grids, and the third terms mean correction amounts for lowering the diffusion of the information points and making the area thereof as small as possible.

Figure 10A:
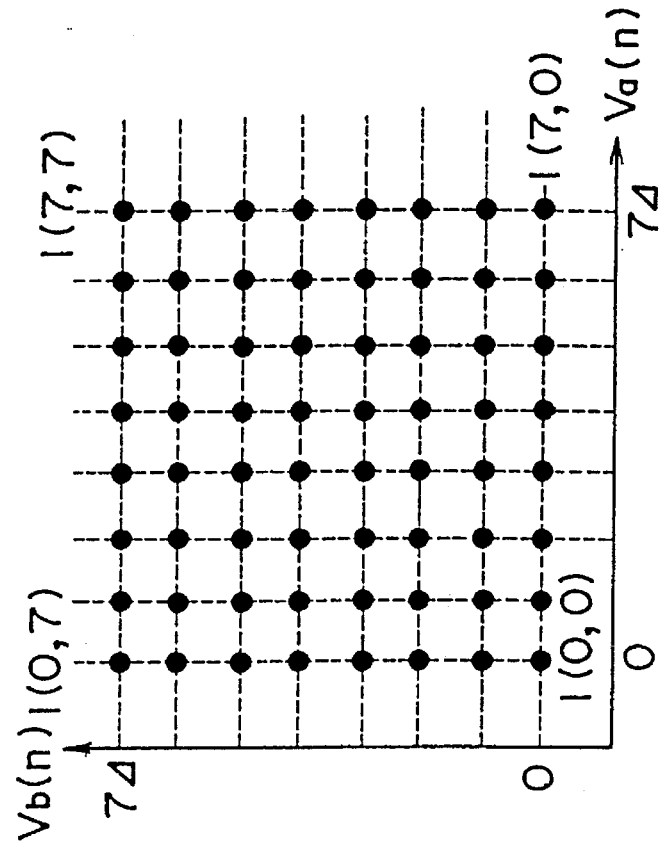
FIGS. 10A and 10B are views for explaining the relationship between the information point and the grid.
Figure 10B:
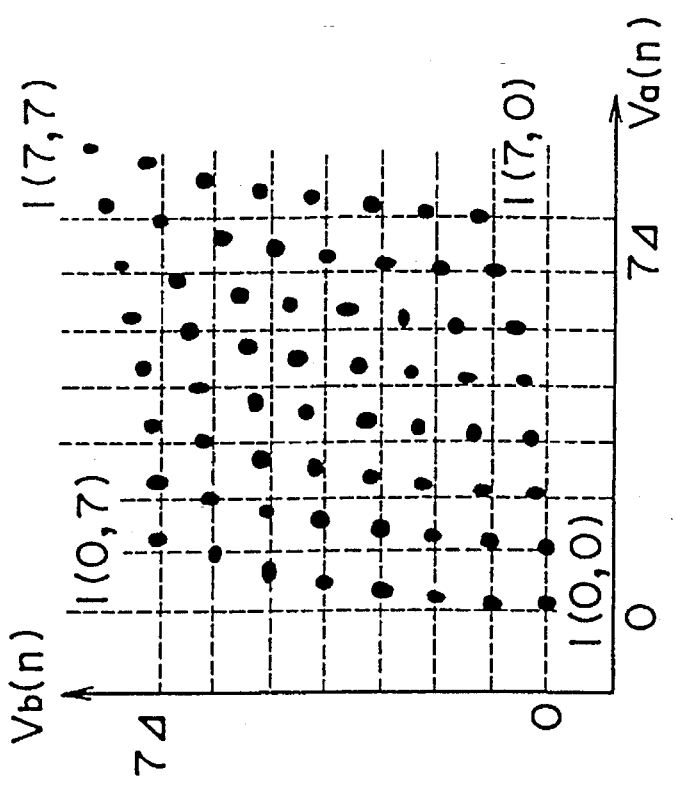

Next, the calculating method for the second term in the above equation will be described. As shown in FIG. 10A, in the case that the correction is not made, information points are deviated from grids: however, as shown in FIG. 10B, by the correction, the information points are positioned on the grids.

Figure 11A:
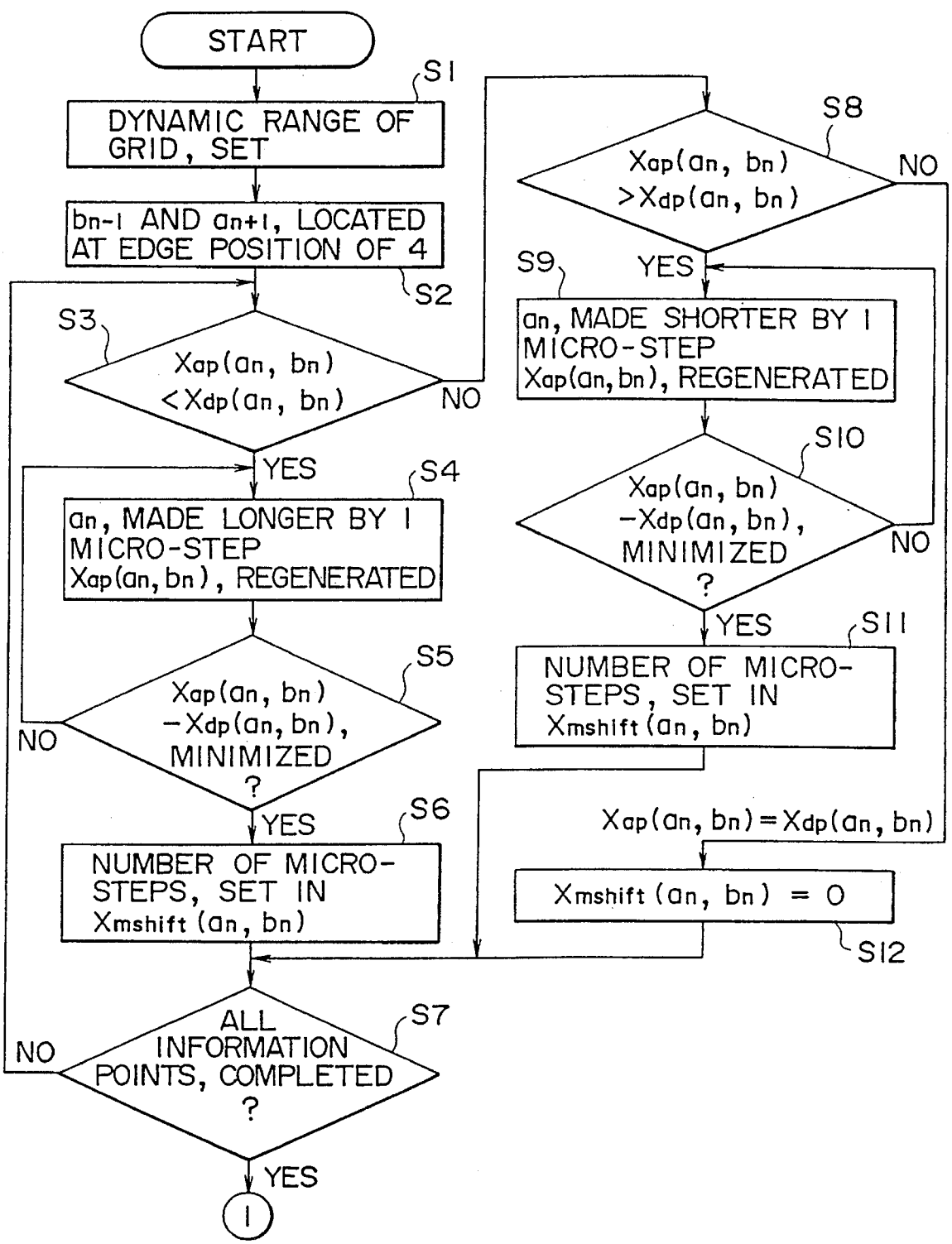
FIGS. 11A and 11B are flow charts for explaining the processes for calculating the edge position to be corrected for positioning the information point at the grid.
Figure 11B:
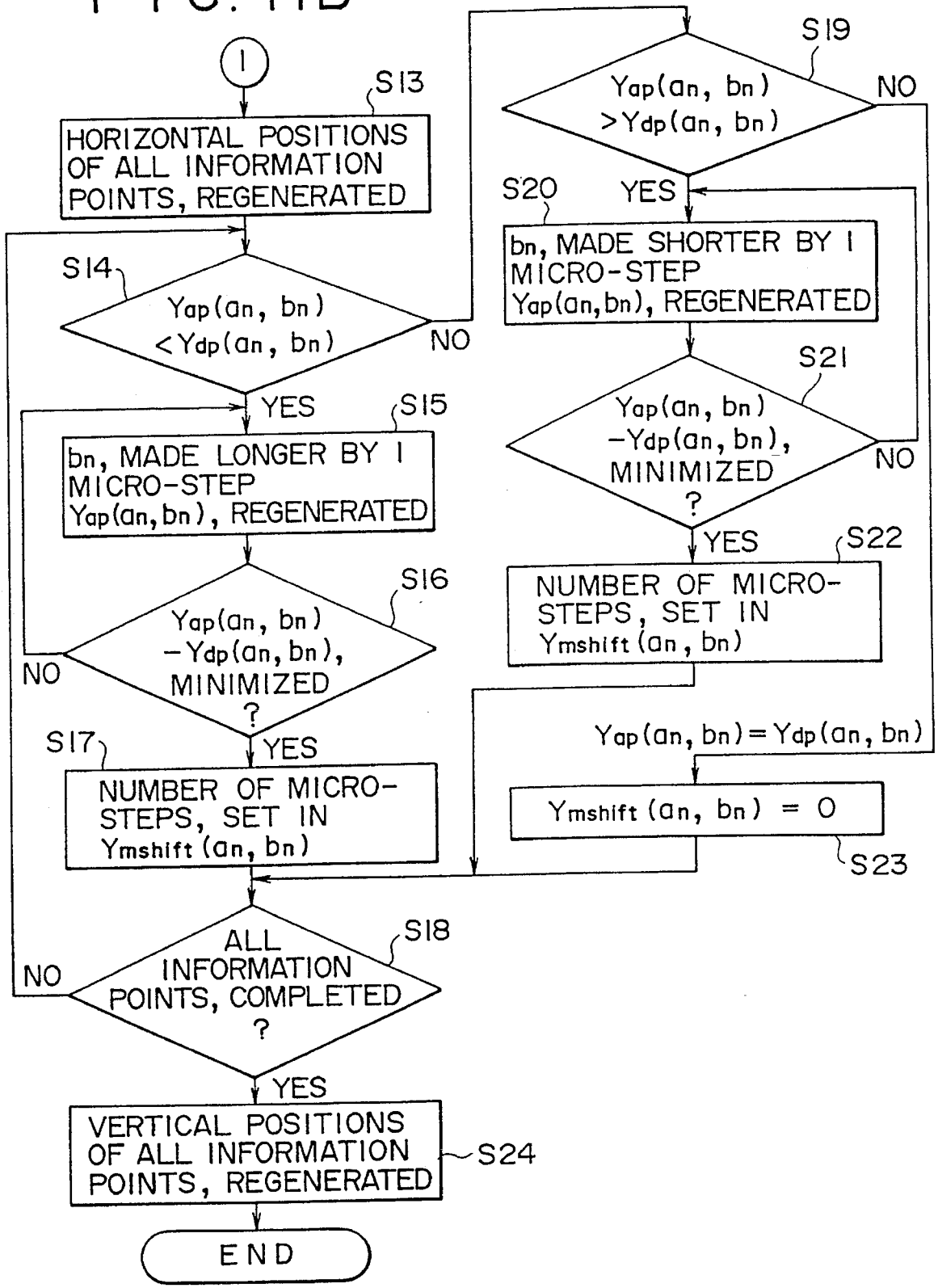

This calculating may be executed on the basis of the flow chart as shown in FIGS. 11A and FIG. 11B. This calculation is executed by, for example a computer, and the result is written in the ROM 25.

First, the step S1, the dynamic range of the grid is set. The dynamic range is specified by the hardware of the reproducing apparatus, and which is divided into eight grids.

In the step S2, the positions of the edges $b_{n-1}$ and $a_{n+1}$ are made to correspond to the position of 4 of the positions of from 0 to 7.

The process proceeds to the step S3, wherein the horizontal position $X_{ap}(a_n, b_n)$ of an information point $I(a_n, b_n)$ is compared in magnitude with a horizontal position $X_{dp}$ ($a_n$, $b_n$) of the desired grid. When the horizontal position $X_{ap}(a_n, b_n)$ of the information point $I(a_n, b_n)$ is smaller than the horizontal position $X_{dp}$ ($a_n$, $b_n$) of the grid (when the information point is positioned on the left side of the grid), the process proceeds to the step S4, wherein the edge $a_n$ is made longer by one micro-step. Thus, the horizontal edge $a_n$ of the information point is regenerated in the data made longer by one micro-step. Then, the process proceeds to the step S5, wherein it is judged whether or not $X_{ap}(a_n, b_n) - X_{dp}(a_n, b_n)$ is minimized. Namely, it is judged whether or not the horizontal position of the information point comes to the nearest position to the horizontal position of the grid. When being not minimized yet, the process is returned to the step S4, and the process in the step S4 is repeated. By repeating the processes in the steps S4 and S5, the horizontal position of the information point is disposed at the nearest position to the position of the grid.

In the step S5, when it is judged that the $X_{ap}(a_n, b_n) - X_{dp}(a_n, b_n)$ is minimized, the process proceeds to the step S6, wherein the repeated number between the steps S4 and S5 (correction number of the micro-steps) is set in $X_{mshift}(a_n, b_n)$.

On the other hand, in the step S3, when $X_{ap}(a_n, b_n)$ is equal to or more than $X_{dp}(a_n, b_n)$, the process proceeds From the step S3 to the step S8, wherein it is judged whether or not $X_{ap}(a_n, b_n)$ is more than $X_{dp}(a_n, b_n)$. When the former is larger than the latter, the information point is positioned on the right side of the grid. Accordingly, in this case, the process proceeds to the step S9, wherein the position of the edge an is shortened by one micro-step. The shortened position is regenerated as a new horizontal position $X_{ap}(a_n, b_n)$ After that, the process proceeds to the step S10, wherein it is judged whether or not $X_{ap}(a_n, b_n)-X_{dp}(a_n, b_n)$ is minimized. When being not minimized, the process is returned to the step S9, and the process in the step S9 is repeated. Namely, the position of the edge $a_n$ is changed by each micro-step until the horizontal position of the information point comes to the nearest position of the horizontal position of the grid.

When it is judged that the nearest position is determined, in the step S11, the number of the micro-steps is set in $X_{mshift}(a_n, b_n)$.

In the step S8, when $X_{ap}(a_n, b_n)$ is not more than $X_{dp}(a_n, b_n)$, since $X_{ap}(a_n, b_n)$ is eventually equal to $X_{dp}(a_n, b_n)$, the process proceeds to the step S12. In this case, 0 is set in $X_{mshift}(a_n, b_n)$. Namely, in this case, since the horizontal position of the information point is equal to the horizontal position of the grid, the fine correction with a unit of micro-step is not performed.

After the steps S6, S10 or S12, the process proceeds to the step S7, wherein it is judged whether or not the horizontal adjustment for all information points is performed. When being not performed, the process is returned to the step S3, and the processes thereafter are repeated. Namely, the horizontal positions of all information points are adjusted to be disposed at the nearest positions to the horizontal positions of the grids.

In the step S7, when it is judged that the horizontal positions of all information points are adjusted, the process proceeds to the step S13, wherein all information points are regenerated at the positions calculated as described above.

In the step S14, it is judged whether or not the vertical position $Y_{ap}(a_n, b_n)$ of an information point is smaller than the vertical position $Y_{dp}(a_n, b_n)$ of the grid. When is is judged that the former is smaller than the latter, the process proceeds to the step S15, wherein the edge $b_n$ is made longer by one micro-step. Thus, the value made longer is regenerated as $Y_{ap}(a_n, b_n)$.

Then, the process proceeds to the step S16, wherein it is judged whether or not $Y_{ap}(a_n, b_n)-Y_{dp}(a_n, b_n)$ is minimized. Namely, it is judged whether or not the vertical position of the information point comes to the nearest position to the vertical position of the grid. When being not disposed at the nearest position, the process is returned to the step S15, and the process in the step 15 is repeated. In the step S16, when it is judged that the vertical position of the information point is disposed at the nearest position to the vertical position of the grid, the process proceeds to the step S17, wherein the number of the micro-steps shifted in the step S15 is set in $Y_{mshift}(a_n, b_n)$.

In the step S14, when $Y_{ap}(a_n, b_n)$ is equal to or more than $Y_{dp}(a_n, b_n)$, the process proceeds to the step S19, wherein it is judged whether or not $Y_{ap}(a_n, b_n)$ is more than $Y_{dp}(a_n, b_n)$. When it is judged that the former is larger than the latter (in FIG. 10, $Y_{ap}(a_n, b_n)$ is positioned over $Y_{dp}(a_n, b_n)$, the process proceeds to the step S20, where the position of the edge $b_n$ is shortened by one micro-step. Thus, $Y_{ap}(a_n, b_n)$ is regenerated as the edge position shortened by one micro-step.

Next, the process proceeds to the step S21, wherein it is judged whether or not $Y_{ap}(a_n, b_n)-Y_{dp}(a_n, b_n)$ is minimized. Namely, it is judged whether or not the vertical position of the information point is disposed at the nearest position to the vertical position of the grid. When being not disposed, the process is returned to the step S20, and the process in the step S20 is repeated. In the step S21, when it is judged that the vertical position of the information point is disposed at the nearest position to the vertical position of the grid, the process proceeds to the step S22, wherein the number of the micro-steps corrected in the step S20 is set in $Y_{mshift}(a_n, b_n)$.

In the step S19, when it is judged that $Y_{pd}(a_n, b_n)$ is not more than $Y_{dp}(a_n, b_n)$, since $Y_{ap}(a_n, b_n)$ is eventually equal to $Y_{dp}(a_n, b_n)$, the process proceeds to the step S23. In this case, 0 is set in $Y_{mshift}(a_n, b_n)$.

After the steps S17, S22 or S23, the process proceeds to the step S18, wherein it is judged whether or not the vertical adjustment for all information points is performed. When being not performed, the process is returned to the step S14, and the processes thereafter are repeated. In the step S18, when it is judged that the vertical processes for all information points are performed, the process proceeds to the step S24, wherein the vertical positions of all information points are regenerated.

By the above processes, there is calculated the data capable of disposing the information points, as shown in FIG. 10A, deviated from the grids at the nearest positions to the grids as shown in FIG. 10B the data of the second terms of the right sides of the equations (5) and (6).

Figure 12A:
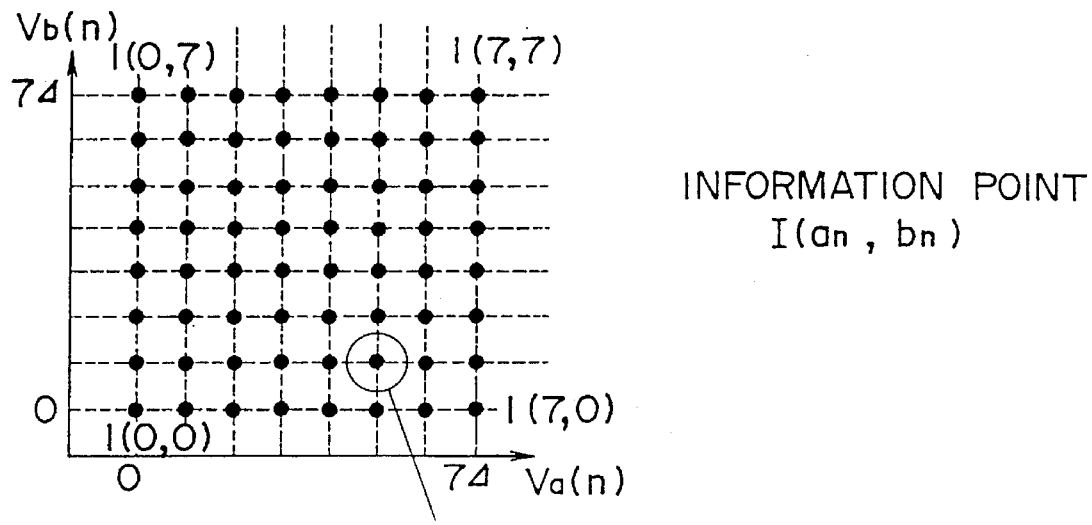
FIGS. 12(a), and 12(b) are views for explaining the state where the information points are scattered.
Figure 12B:
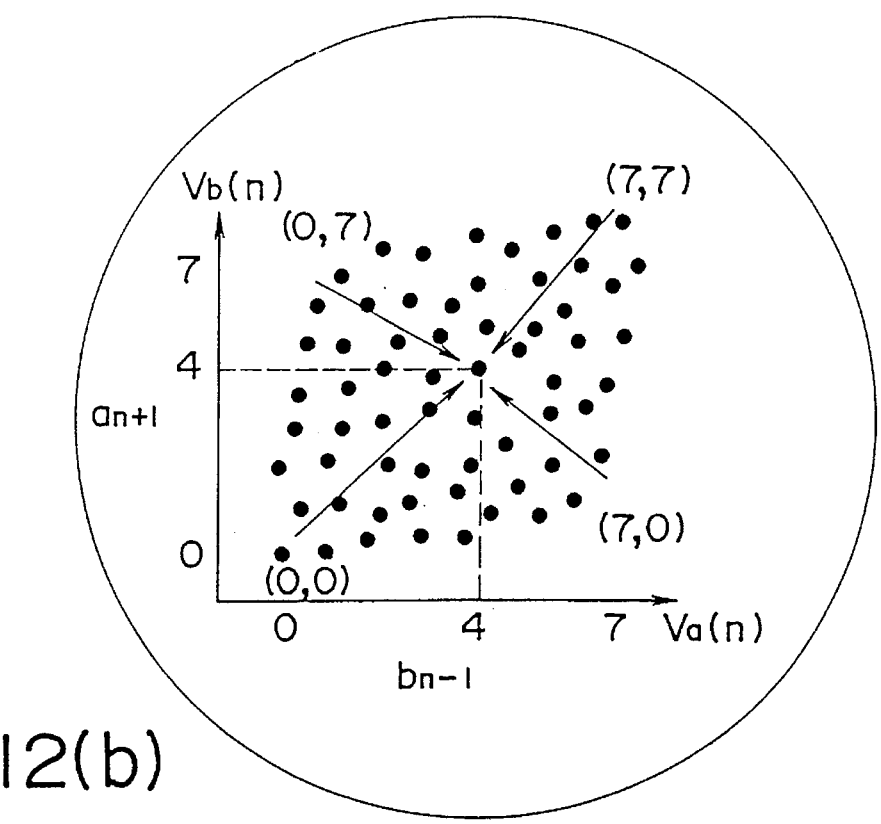
Figure 13A:
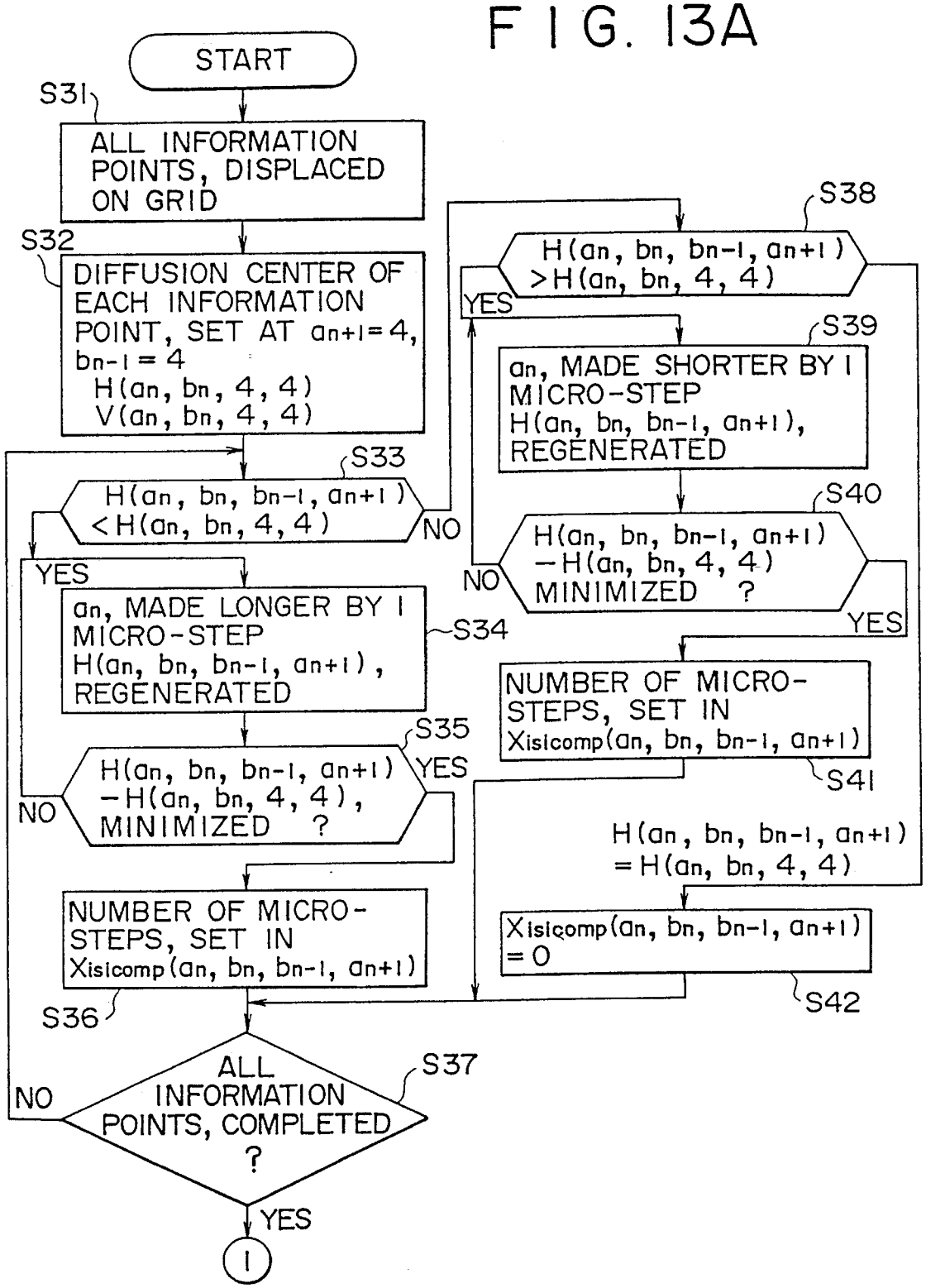
FIG. 13A and 13B are flow charts for explaining the processes for calculating the edge position for concentrating the information point at a specified point.
Figure 13B:
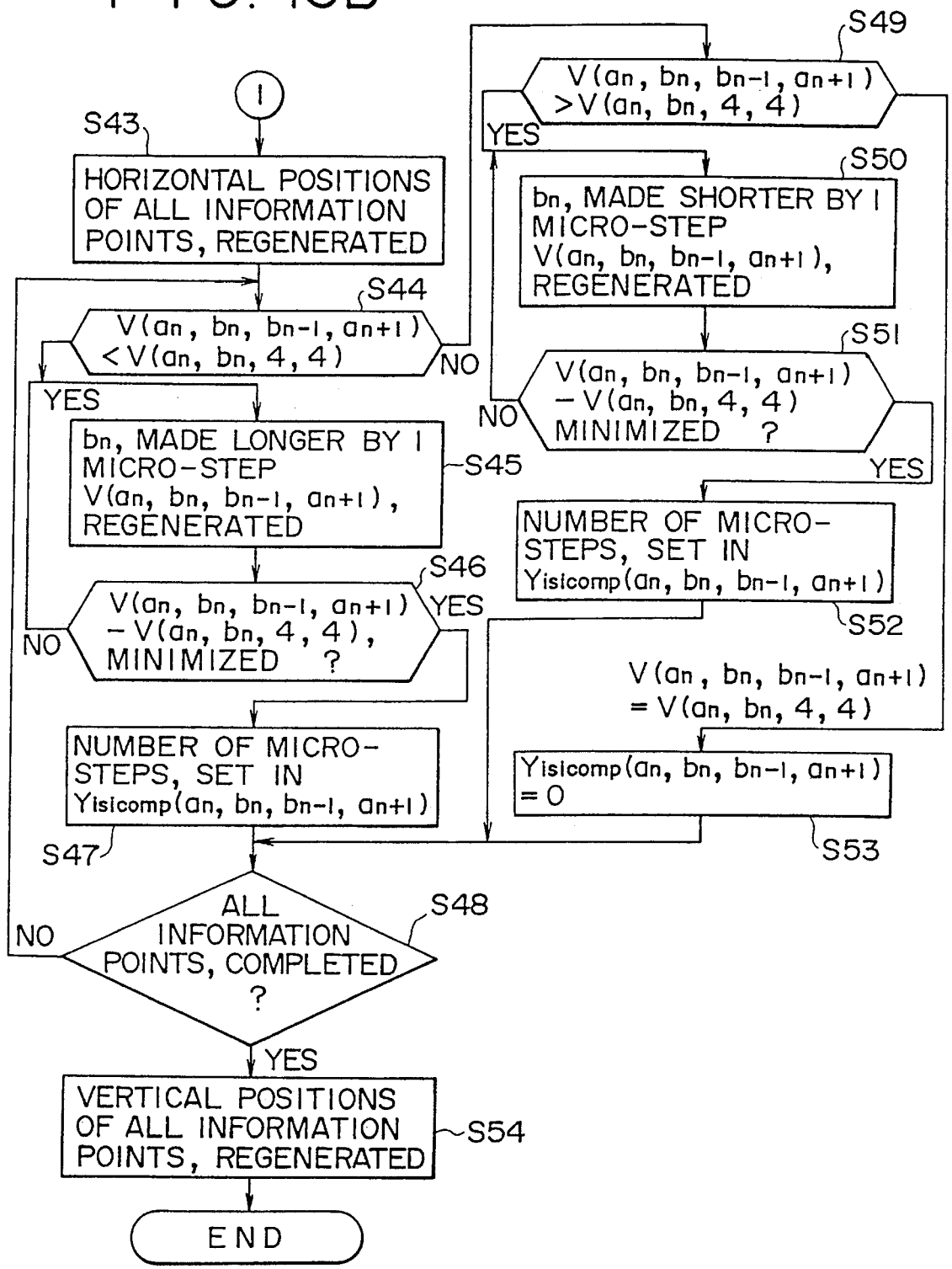

Next, a method of concentrating the information point at a specified point (reducing the area of the information point) will be described. As is apparent from the enlarged view of the one information as shown in FIG. 12, the one information point is constituted of a set of small information points in the number of 8×8 pieces (these are also produced in correspondence to the positions of the edges of from 0 to 7) indicated on coordinate axes specified by the other edges $b_{n-1}$ and $a_{n+1}$, respectively disposed on the front and rear sides of the edges $a_n$ and $b_n$. For concentrating (focussing) the information point at one point, the position of the edge may be corrected by executing the processes as shown in FIGS. 13A and 13B.

First, at the step S31, all information points are shifted on the grids. The processing may be performed by executing the processes as shown in FIGS. 11A and 11B.

Next, the process proceeds to the step S32, wherein the diffusion center (point to be concentrated) of each information point is set at the point (intermediate point) specified by $(b_{n-1}=4, a_{n+1}=4)$ on the coordinate axes indicated by the $b_{n-1}$ and $a_{n+1}$ enlargedly shown in FIG. 12. Then, the horizontal and vertical positions of the information point are expressed as $H(a_n, b_n, 4, 4)$ and $V(a_n, b_n, 4, 4)$, respectively.

The process proceeds to the step S33, wherein it is judged whether or not the horizontal position $H(a_n, b_{n-1}, a_{n+1})$ of the information point is smaller than the horizontal position $H(a_n, b_n, 4, 4)$ of the diffusion center specified in the step S32. Namely, it is judged whether or not the position of the information point is positioned on the left side of the center to be concentrated. When it is judged that the horizontal position of the information point is positioned on the left side of the horizontal point to be concentrated, the process proceeds to the step S34, wherein the edge $a_n$ is made longer by one micro-step. The position $H(a_n, b_n, b_{n-1}, a_{n+1})$ of the information point is regenerated at the position thus obtained.

Then, the process proceeds to the step S35, wherein it is judged whether or not $H(a_n, b_n, b_{n-1}, a_{n+1})-H(a_n, b_n, 4, 4)$ is minimized. Namely, it is judged whether or not the horizontal position of the information point is disposed at the nearest position to the horizontal position of the point to be concentrated. When being not disposed, the process is returned to the step S34, and the process in the step S34 is repeated.

In the step S35, when it is judged that the horizontal position of the information point is disposed at the nearest position to the horizontal position of the point to be concentrated, the process proceeds to the step S36, wherein the number of the micro-steps set in the step S34 is set in $X_{isicomp}(a_n, b_n, b_{n-1}, a_{n+1})$.

In the step S33, when it is judged that $H(a_n, b_n, b_{n-1}, a_{n+1})$ is equal to or more than $H(a_n, b_n, 4, 4)$, the process proceeds to the step S38, wherein it is judged whether or not the former is larger than the latter. When it is judged that the former is larger than the latter (when the horizontal position of the information point is positioned on the right side of the horizontal position of the point to be concentrated), the process proceeds to the step S39, wherein the edge $a_n$ is set to be shorter by one micro-step. The value made shorter is regenerated as the horizontal position $H(a_n, b_n, b_{n-1}, a_{n+1})$ of the information point.

The process proceeds to the step S40, wherein it is judged whether or not the horizontal position of the information point is disposed at the nearest position to the horizontal position of the point to be concentrated. When being not disposed, the process is returned to the step S39, and the process in the step S39 is repeated. When it is judged that the horizontal position of the information point is disposed at the nearest position to the horizontal position of the point to be concentrated, the process proceeds to the step S41, wherein the number of the micro-steps set in the step S39 is set in $X_{isicomp}(a_n, b_n, b_{n-1}, a_{n+1})$.

In the step S38, when it is judged that $H(a_n, b_n, b_{n-1}, a_{n+1})$ is not more than $H(a_n, b_n, 4, 4)$, since the former is eventually equal to the latter, the process proceeds to the step S42, wherein 0 is set in $X_{isicomp}(a_n, b_n, b_{n-1}, a_{n+1})$.

After the processes of the steps S36, S41 and S42, the process proceeds to the step S37, wherein it is judged whether or not the horizontal positions of all information points are disposed at the nearest positions to the horizontal positions of the points to be concentrated. When the information points for which the process is not completed are present, the process is returned to the step S33, and the processes thereafter are repeated.

In the step S37, when it is judged that the horizontal positions of all information points are concentrated at the nearest positions to the horizontal positions of the points to be concentrated, the process proceeds to the step S43, wherein the horizontal positions of all information points are regenerated. Thus, the process proceeds to the step S44. The processes from the steps S44 to S54 are similar to those from the steps S33 to S42, except that the direction is changed from the horizontal direction to the vertical direction. Accordingly, by executing the processes from the steps S44 to S54, the vertical positions of the information points are concentrated at the nearest positions to the vertical positions of the points to be concentrated.

As described above, the data of the third terms on the right sides in the equations (5) and (6) are calculated. The data thus obtained are stored in the ROM 25 as the converting table.

Figure 14:
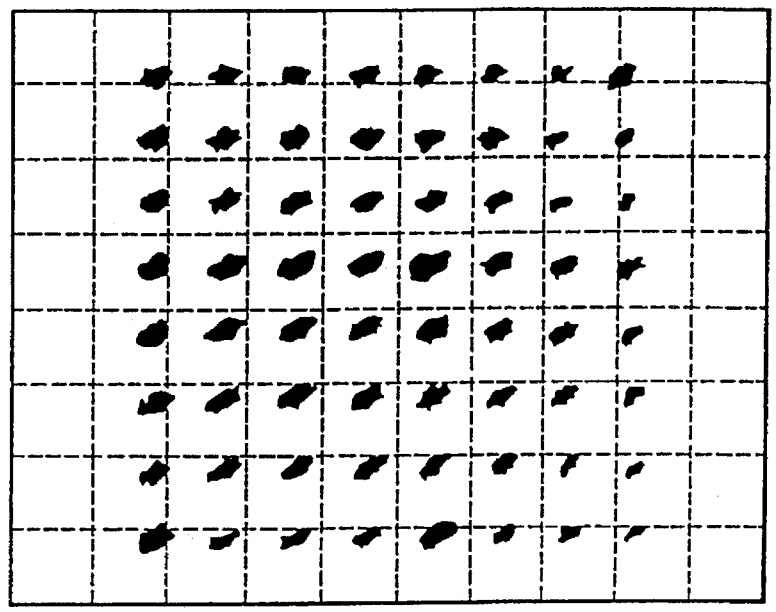
FIG. 14 is a view for explaining the state of the information points obtained by executing the processes as shown in FIGS. 10A and 10B.

FIG. 14 shows the information points obtained by the reproduced signals in the case that the converting table in the ROM 25 is produced so as to contain the correction amount obtained by execution of the processes as shown in FIGS. 11A and 11B. It is revealed that the information points correspond to the grids.

Figure 15:
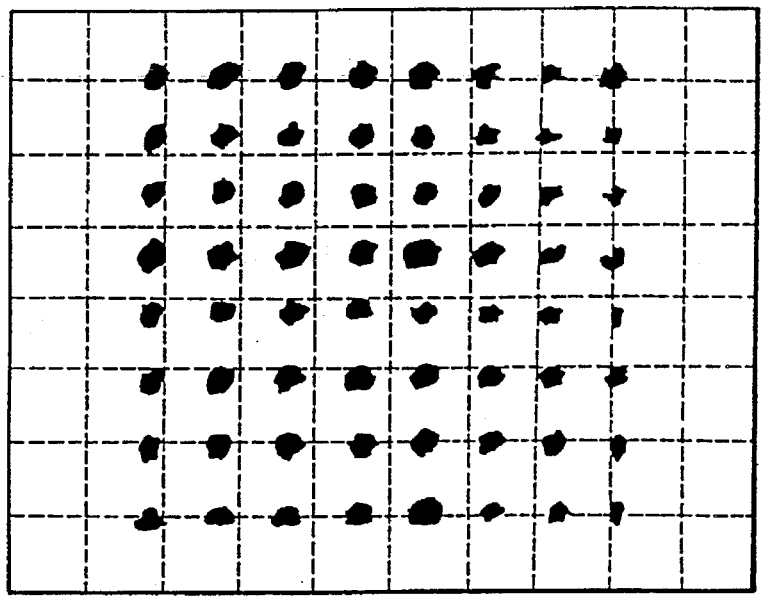
FIG. 15 is a view for explaining the-state of the information points obtained by executing the processes as shown in FIGS. 13A and 13B.
Figure 17:
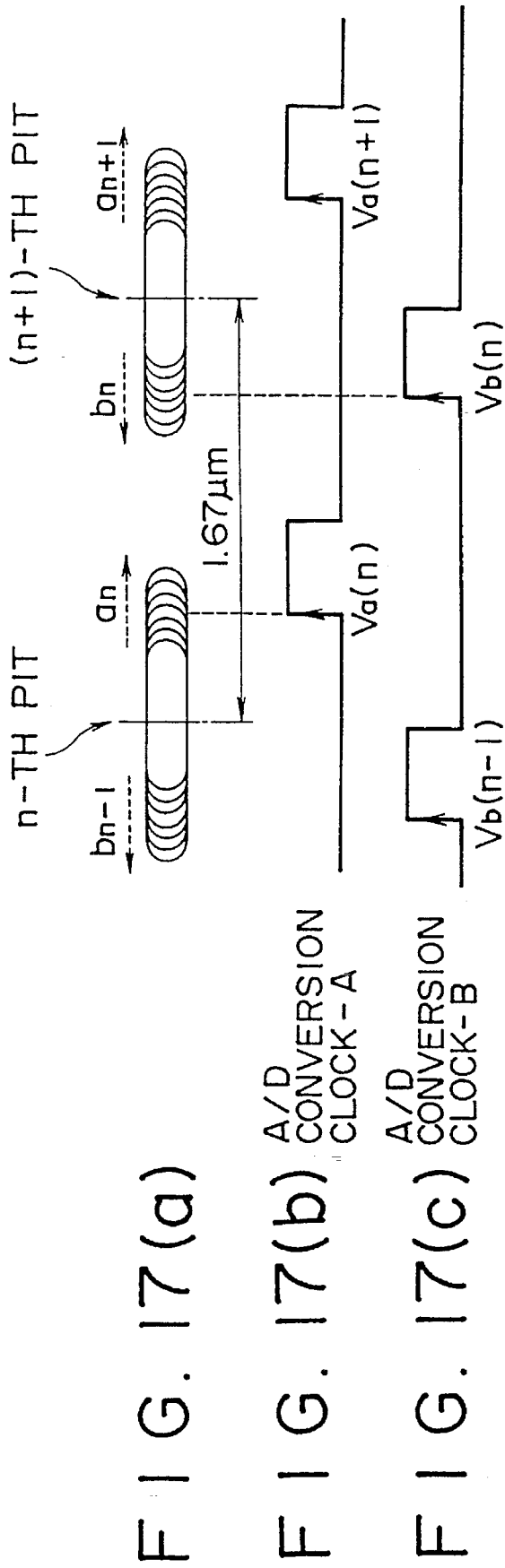
FIGS. 17(a), 17(b) and 17(c) are views for explaining the principle of displacing the edges of pits on a medium stepwise for recording the information.
Figure 18:
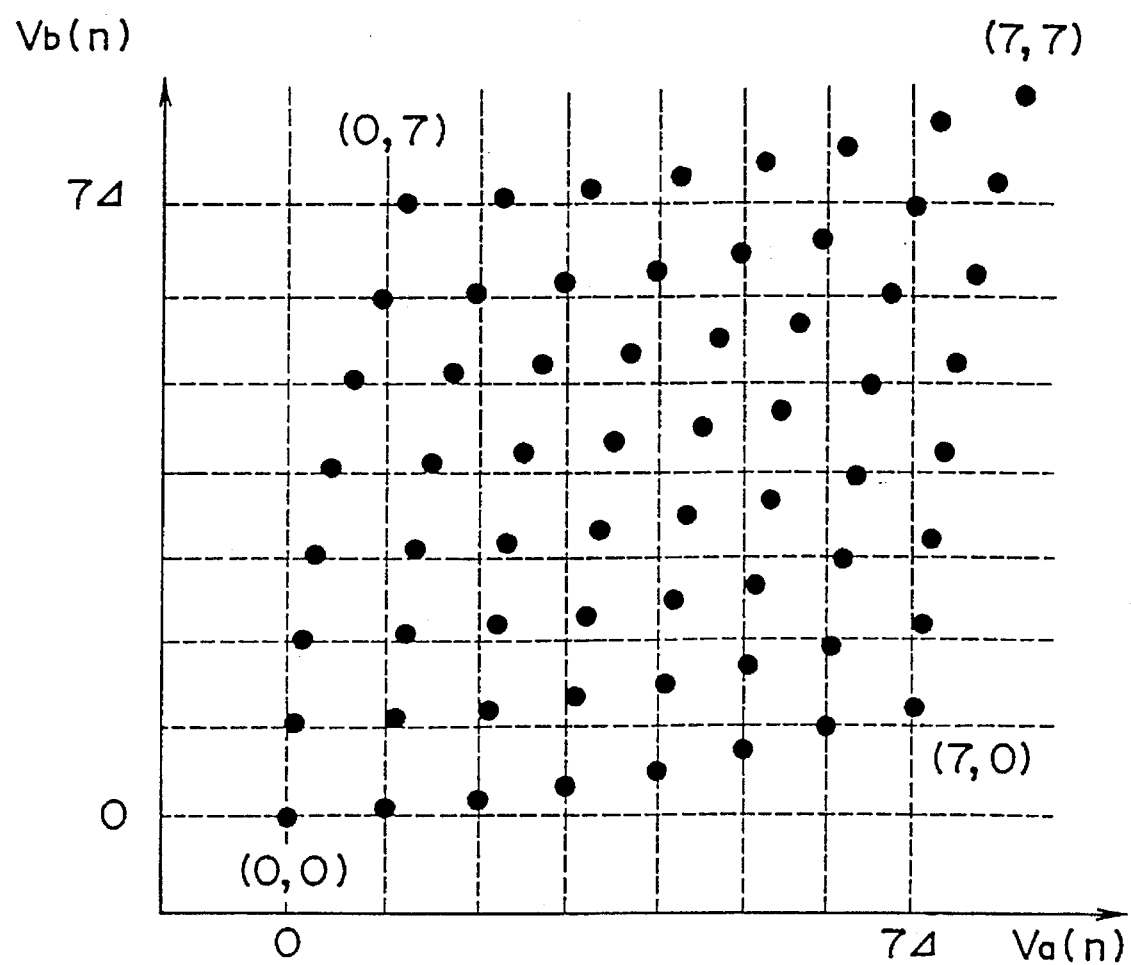
FIG. 18 is a view for explaining the principle wherein two edge positions are read out as the information points on s coordinate plane.
Figure 19A:
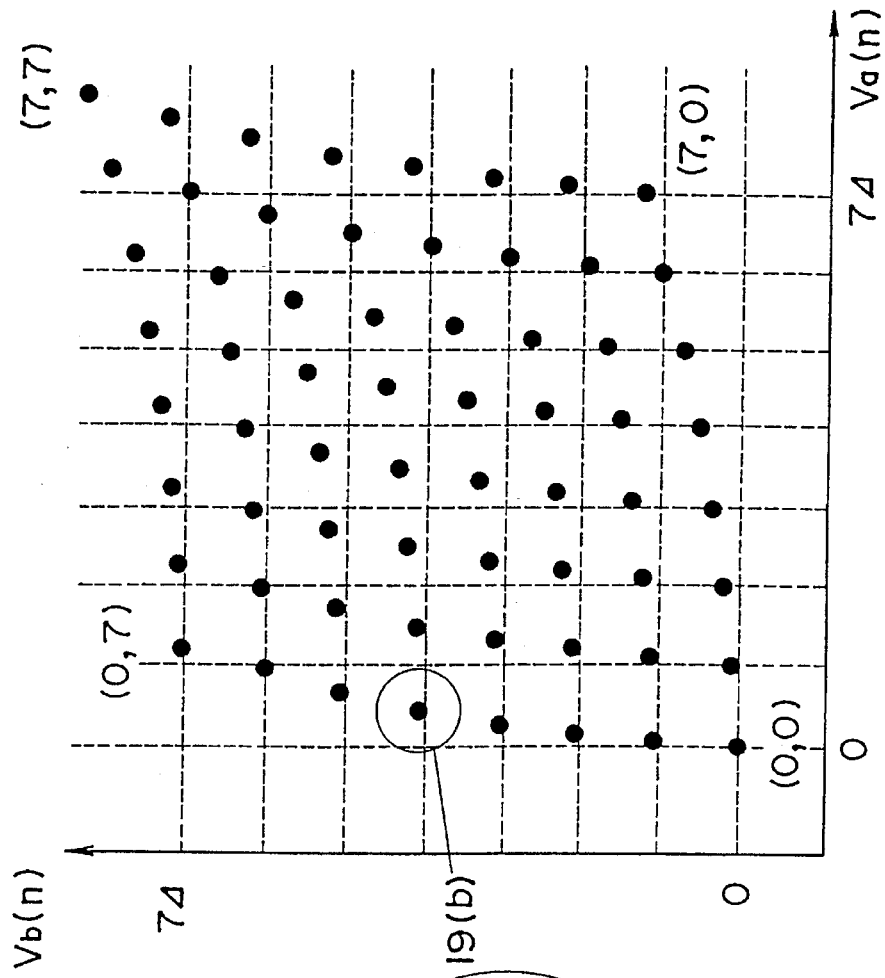
FIGS. 19(a), and 19(b) are views for explaining the diffusion of the information points.
Figure 19B:
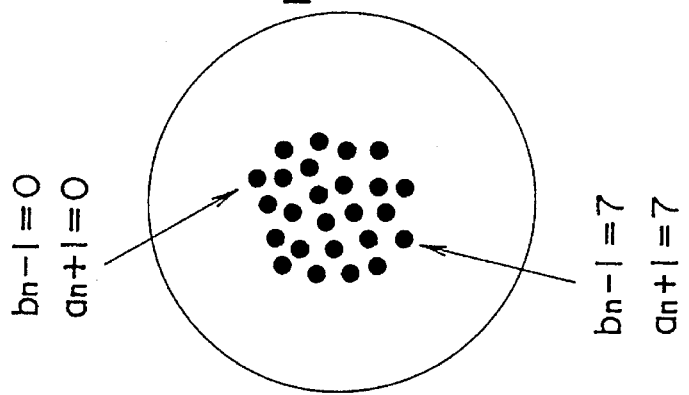

Further, FIG. 15 shows the information points in the case that the converting table is written in the ROM 25 in consideration of the correction amount obtained by the processes as shown in FIGS. 13A and 13B other than FIGS. 11A and 11B. As compared with the case as shown in FIG. 16 in which the correction is not performed, the area of the information is made smaller (concentrated at the specified point), and the separation from the adjacent information point is made easy.

In the method using the line spread function as shown in FIG. 7, the information point is concentrated at the position (0,0) within the plane specified by the coordinate axes (FIG. 12) of the edges $b_{n-1}$, and $a_{n+1}$. On the contrary, in the processes as shown in FIGS. 13A and 13B, the information point is concentrated at the position (4, 4) as shown in FIG. 12. The concentration to the latter point is preferable because the distance by which the fine information point is shifted is made smaller, and the number of the micro-steps necessary for the correction is reduced. Namely, the inter symbol interference is reduced, which makes it possible to reduce the calculating number.

As described above, according to a first aspect of the data recording method of the present invention, since the position of the edge specified by the first width is displaced, at a position where the interference due to the positions of the other edges is minimized, stepwise with the second step, it is possible to reduce the inter symbol interference, and hence to perform a higher density recording.

According to the data recording medium of the present invention, since the position of the edge specified by the first width of the pit is displaced, at a position where the interference due to the positions of the other edges is minimized, stepwise with the second step, it is possible to provide a data recording medium recorded with a high density.

According to the data recording apparatus of the present invention, the position of the edge displaced stepwise with the first width is displaced stepwise with the second width, it is possible to record a data on a recording medium with a higher density.

What is claimed is:

1. A data recording apparatus for displacing a position of an edge of each pit on a recording medium stepwise with a first width for recording data on said recording medium, comprising:

a converting means for converting a first data to be recorded into a second data corresponding to a number of steps displaced with said first width;

a calculating means for calculating the position of said edge of each pit displaced with said first width corresponding to the second data converted by said converting means, and displacing the position of said edge specified by said first width stepwise with a second width smaller than said first width, wherein the second width is determined on the basis of positions of edges of other pits so that an interference caused by the edges of the other pits is reduced; and a signal generating means for outputting a signal with a timing corresponding to the position of the edge of said pit according to an output of said calculating means.

2. A data recording apparatus according to claim 1, wherein said signal generating means further comprises:

a D/A converting means for digital-analog converting the output of said calculating means;

a sawtooth wave generating means for generating a sawtooth wave;

a comparing means for comparing the sawtooth wave outputted from said sawtooth wave generating means with the output of said D/A converting means.

* * * * *